United States Patent

[11] 3,598,929

[72] Inventor Stanley M. Seidman
Shaker Heights, Ohio

[21] Appl. No. 690,522
[22] Filed Dec. 14, 1967
[45] Patented Aug. 10, 1971
[73] Assignee The Hickok Electrical Instrument Company
Cleveland, Ohio

[54] ELECTROACOUSTIC TRANSMISSION TESTING DEVICE
1 Claim, 10 Drawing Figs.

[52] U.S. Cl. .......... 179/175
[51] Int. Cl. .......... H04r 29/00
[50] Field of Search .......... 179/175, 175.1

[56] References Cited

UNITED STATES PATENTS 2,265,292 12/1941 Krebs .......... 179/175.1
3,261,926 7/1966 Bryant et al. .......... 179/175.1

*Primary Examiner*—William C. Cooper
*Assistant Examiner*—David L. Stewart
*Attorney*—Baldwin, Doran & Egan

ABSTRACT: An electronic test instrument for determining the electroacoustic efficiency of operation of a telephone and its associated wire line. The test instrument includes circuitry for translating audio energy into corresponding levels of electrical energy and electrical metering equipment to visually indicate the said levels of energy. The test instrument is capable of measuring the transmitting and receiving efficiency of operation of the telephone and connected wire line which in the art is also known as a loop-and-station and enables the energy losses in the four main component parts of the loop-and-station, i.e., the loop, telephone receiver, telephone transmitter and the telephone circuit to be measured.

INVENTOR.
STANLEY M. SEIDMAN
BY
Baldwin, Doran & Egan
ATTORNEYS

INVENTOR.
STANLEY M. SEIDMAN
BY
Baldwin, Doran & Egan
ATTORNEYS

POSITION #1 of SWITCH-91 (SELF CHECK TEST)

POSITION #2 of SWITCH-91 (LISTENATOR TEST)

INVENTOR.
STANLEY M. SEIDMAN
BY
Baldwin, Doran & Egan
ATTORNEYS

POSITION #3 of SWITCH 91 - (WHISTELLATOR TEST)

POSITION #4 of SWITCH 91- (BARE-LINE RECEIVING TEST)

POSITION #5 of SWITCH-91-(BARE-LINE SEND TEST)

INVENTOR.
STANLEY M. SEIDMAN
BY
Baldwin, Doran & Egan
ATTORNEYS

ELECTROACOUSTIC TRANSMISSION TESTING DEVICE

This invention relates to the measurement of electroacoustic transmission efficiency of a telephone and its associated wire line or transmission channel. In particular this invention relates to a portable testing apparatus comprising several testing arrangements which, in combination, serve to detect and locate any defects which adversely affect the electroacoustic efficiency of a telephone station tested by means of such a test set.

A telephone station is a telephone which is in service at a particular location. Generally the station is connected by a pair of wires to switching equipment in a nearby central office. This pair of wires is known as the loop. The combination of a station and its loop is sometimes called a loop-and-station and this term will be used in the present discussion.

The electroacoustic efficiency of a loop-and-station is expressed by the receiving loss for speech energy reaching the station receiver and the transmitting efficiency for speech energy impinging on the station transmitter.

The receiving loss of a loop-and-station (usually expressed in decibels with reference to a standard loop-and-station) tells how well a normal average person can hear at the station so rated. Included in this effect, as determined for design purposes, there may be subjective effects such as room noise and waveform distortion and the listener's hearing. But in modern telephones, the principal component is the volume of acoustic power at the receiver for a standard level of voice-frequency power entering the loop at the central office.

It is not standard practice to measure receiving loss at telephone stations. There has been no standard test arrangement, no method, no procedure for making such measurements. When the receiving efficiency is reported to be inadequate, the only test made is a conversation between a repairman at the station and a test man at the repair center. Evaluation rests entirely upon the ear and judgment of the repairman. Only the most extreme deficiencies can be detected with any confidence by such means.

It is an object of this invention to provide a testing arrangement for measuring the receiving efficiency of the loop-and-station. This measurement should be made quickly and easily. It should not require manual assistance at the central office end of the loop. Although receiving loss varies with the frequency of the audio energy input, measurement at a single frequency is sufficient for trouble detection. A frequency of 1,000 hertz is convenient because it is available in the central office, at the standard level of 1 milliwatt, and may be reached by dialing.

The receiving loss is affected by the energy losses in its three main component parts: the loop, the receiver and the telephone circuitry. Defects can raise the losses in any of these components. If the test at a station indicates excessive loss it becomes necessary to locate the cause. This can be done by measuring the loss of the loop alone. The difference between this loss and the measurement of receiving loss will indicate whether the telephone is defective. If this difference is not excessive, but the loop loss is high, appropriate action will be indicated for the loop. When a defective telephone has been indicated, the most likely cause is a defective receiver. A retest after replacement of the receiver will show whether the defect has been corrected and, if not, the circuitry should be replaced as defective.

It is an object of this invention to provide a testing arrangement for measuring the loss in the loop alone. This is a standard arrangement already available but in the invention it will be included as an integral part of the test set for convenience in completing the entire test procedure.

Even in a normal loop-and-station, one with no defects, the losses of the loop vary with its length and its design and the losses of the telephone circuitry as designed may be intentionally made to vary inversely with loop resistance in an effort to compensate for the better transmission efficiency of short loops. Allowance must be made for these normal variations in order to recognize whether a defect exists.

The following discussion of normal variation in receiving loss is based on loops equipped with a telephone of the Western Electric 500 series or the equivalent product of another manufacture. Such sets account for the great majority of telephone stations.

The normal variation in loss of the telephone circuitry is not a problem. The loss is intentionally high on short loops (under 6 kilofeet) where it is more than offset by the reduction in loop loss. On all other loops the circuitry loss is almost independent of loop length.

The loop loss normally varies from zero to 9.5 decibels if the loops are assumed to be designed to a 1,200 ohm limit, and if all loops longer than 18 kilofeet are loaded on 6 kilofeet spacing with 88 millihenry inductors. It is assumed also that bridged taps in the loops do not exceed 6 kilofeet total length. All of these assumptions are standard design procedure for many central office areas. For such design (and allowing for normal central office cabling) the loop loss will measure close to 7.5 db. for loop lengths from 18 to 54 kilofeet and not more than 7.5 db. for loop lengths between zero and 12 kilofeet. Receiving loss can be calibrated to measure 7.5 db. when the line loss measures 7.5 db. Then, for long nonloaded loops—those between 12 and 18 kilofeet—both loop loss and receiving loss will be more than 7.5 and will approach 9.5 db.

This makes it possible to set a receiving efficiency limit of 7.5 db. within which the loss of the loop alone need not be measured. This reduces the amount of testing required and yet provides a clear separation between situations which are normal and those which are probably defective.

If the receiving loss measures more than 7.5 db. the loop loss must be measured. If the loop loss is between 7.5 and 9.5 db. the loop loss is high, either by design or by defect. If it is 10 db. or more there is definitely a loop defect.

It is an object of this invention to provide a combination of two tests (the listenator test which measures receiving loss and the receiving test which measures bare-line loop loss in the receiving direction) and a simple procedure to use these tests to determine whether there is a defect in the receiver, the telephone circuitry or the loop. After corrective action, the same procedure verifies that the defect has been removed.

The transmitting loss of a loop-and-station, like the receiving loss, is usually expressed in decibels with reference to a standard loop-and-station. It tells how well the talker at the station can make himself heard. There are subjective effects, such as sidetone volume and the talker's voice. But from a maintenance standpoint the principal component of transmitting loss is the ratio of audiofrequency energy reaching the central office end of the loop to the acoustic level applied at the transmitter.

There has been no standard method for field testing of the transmitting loss of a station nor of a loop-and-station. Some attempts have been made to measure each or both for investigative purposes. These attempts were experimental and not notably successful. The normal variability in the efficiency of a transmitter, in use or under test, tends to mask the abnormal deviation from normal which the tester is trying to detect.

It is also another object of the invention to provide a testing arrangement to measure the transmitting efficiency of the station while it is being furnished its usual DC supply by its own loop. The test will be simple to make. It will preferably be a single-frequency test. Since the loop is not included in the measurement, it will be a one-man test. It is called the whistelator test in this invention.

Although the transmitting efficiency of a loop-and-station is conventionally referred to as transmitting loss, the transmitter actually has a transmitting gain which exceeds the losses of the loop and the telephone circuitry. That is to say the transmitter supplies much more audiofrequency electrical energy than the energy it receives acoustically. The gain varies with frequency. Modern transmitters achieve their best transmitting gain in the intelligibility band of frequencies which lies roughly between 1,500 and 3,000 hertz. The Western Electric 0500 series of telephones, using the T-1 transmitter, achieves its best transmitting gain at 2,400 hertz.

A defective T-l transmitter may have reduced gain throughout its normal frequency range or it may suffer a shift in its peak frequency reducing its gain only at the higher frequencies. To detect both types of defect, the test frequency should be at or near the peak frequency of the transmitter.

It is an object of this invention to use a whistellator test frequency, for the transmitting efficiency test, which will detect not only transmitters with a deficient gain generally throughout the voice frequency band but also those with an unwanted shift in peak frequency. Tentatively a frequency of 2,300 hertz has been chosen but this frequency can be changed, depending on what frequency shift the telephone industry determines to be acceptable in its transmitters.

The impedance of the loop, at the station, varies with loop length and design. The loop impedance introduces an undesired variable in the transmitting gain, tending to mask the defects the tester is trying to detect.

It is an object of this invention to limit the effect of loop impedance by bridging a low impedance shunt across the loop terminals during the whistellator test. This is done automatically by including the shunt in the test circuit. The test conditions for measuring transmitting efficiency need not be the same as the service conditions. All that is necessary is that the defects which affect speech in normal talking conditions will similarly affect the test. The transmitter need not be in normal talking position. The horizontal position is more stable and less subject to human errors. The acoustic coupling need not be loose as in the talking condition. Tight coupling is more constant and free of acoustic reflections. The loop impedance need not approximate an average loop. A much lower impedance can be used. It is however necessary to assure that the test condition does in fact react to defects in such a manner as to reject stations which are defective in the normal talking condition. This can be verified by simulation tests in the laboratory.

It is an object of this invention to create a convenient and reliable test condition for measuring transmitting efficiency but one which is demonstrably equivalent to the normal talking condition insofar as the effect of defects are concerned.

There are, in rare cases, loops which do not have the same loop loss in both directions. For example, in lightly populated areas, there are customer lines which operate on carrier systems. Also, there are special services which operate on four-wire voice facilities with voice repeaters. The test set which is the subject of this invention can be applied to special services. For cases where the loop loss is not the same in both directions, it is desirable to have a test arrangement for measuring loop loss in the transmitting direction.

It is an object of this invention to provide a testing arrangement to measure loop loss in the transmitting direction. This arrangement should supply 1 milliwatt of energy at 1,000 hertz. The most useful impedance for this purpose is 900 ohms, resistive. The level of energy reaching the central office can be measured with standard testing equipment which is generally available at such locations.

With these objects to accomplish, the invention is a portable test set which contains the following principal units:

1. An electromagnetic transducer, designed to operate at voice frequencies. It converts electric waves to sound waves and sound waves to electric waves. A good telephone receiver can be used for this purpose. It should be rugged and shock mounted. A Western Electric LA-1 receiver has been used successfully.
2. An oscillator designed to generate a single-frequency oscillation in the voice range. It is solid-state and stable over a wide temperature range. It is used in two ways:
   a. In the bare-line sending test, the oscillator supplies 1 milliwatt at 1,000 hertz and at an impedance of 900 ohms resistive. This energy enters the loop at the station and its level is measured at the central office to determine the loop loss in the transmitting direction.
   b. In the whistellator test, the oscillator together with the electromagnetic transducer supplies acoustic energy to the transmitter at a standard level and a frequency of 2,300 hertz (or at a slightly different frequency depending on the frequency characteristics designed into the transmitter and the allowable frequency shift of these characteristics in service).
3. An electronic voltmeter designed to measure voice-frequency voltage. The amplifier is solid-state and stable over a wide temperature range. The meter is rugged and has a logarithmic movement. It has a uniform decibel scale with a range of 20 db. This electronic voltmeter is used in three ways:
   a. In the bare-line receiving test, it measures the level of the 1,000 hertz wave reaching the station end of the loop from the standard one-milliwatt supply at the central office.
   b. In the listenator test, it measures the acoustic level at the station receiver produced by this same received level at the station. In that way it indicates the electroacoustic efficiency or receiving loss of the loop-and-station.
   c. In the whistellator test, it measures the level of audio energy entering the loop from the station (with a low impedance shunt bridged at the junction) as the result of the standard level of acoustic energy applied to the transmitter. In this way it indicates the transmitting gain of the station telephone at the test frequency.
4. A test jack and test cord used to connect the test set to the line terminals.
5. An inductor or holding coil used to hold up the connection at the central office during measurement of loop loss.
6. A battery to supply biasing current to the electronic circuitry of the test set.
7. A nonlocking pushbutton to energize the test set only while a test is being made.
8. A rotary function switch to select the test-to-be-made and connect the appropriate units of the test set for that test.
9. A test circuit to check that the oscillator and the electronic voltmeter are in proper operating condition.

A typical successful design in accordance with this invention is described in detail in the following specification and illustrated in FIGS. 1 to 5 on the attached drawings. This is followed by a detailed description of the operation of the test set as illustrated by FIGS. 6 to 10, also attached. Reference numbers are not repeated on more than one figure except to identify the same part when it appears on more than one figure.

Figure 7:
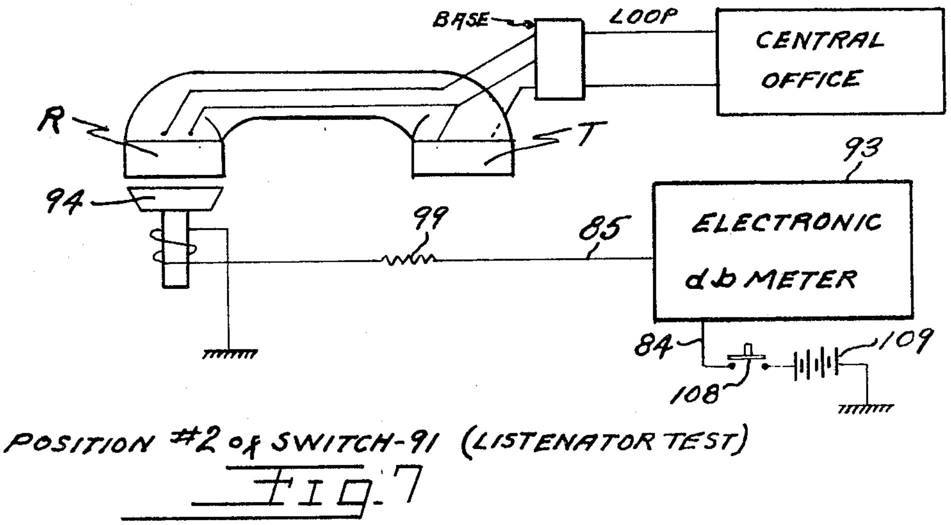
Figure 8:
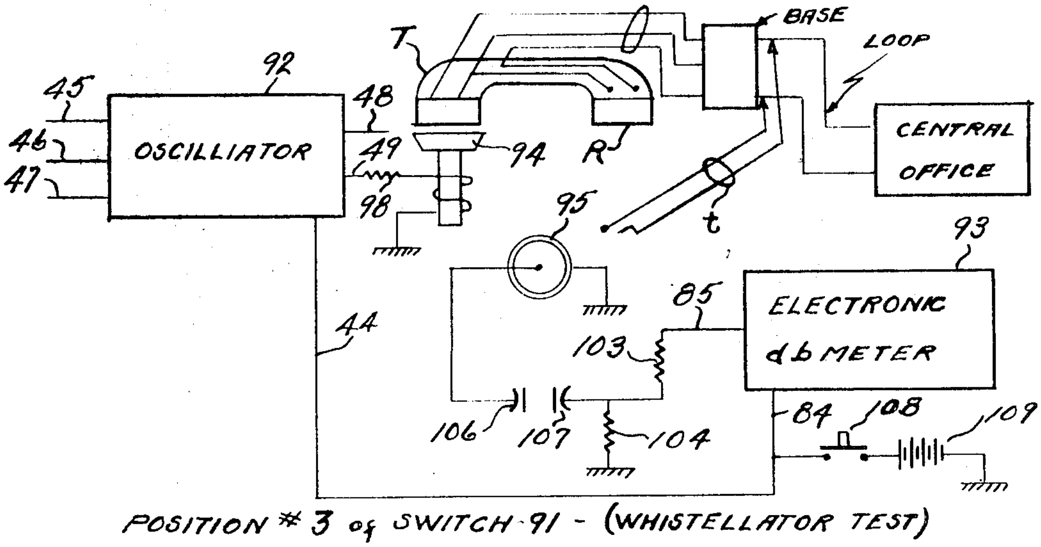
Figure 9:
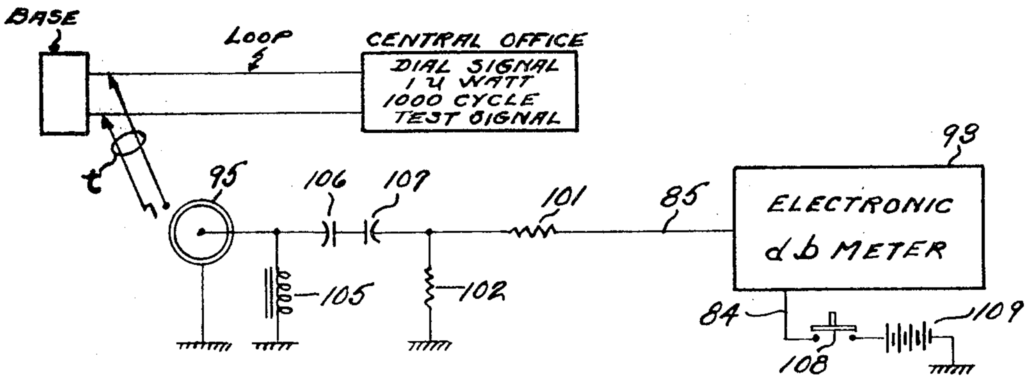

FIG. 7 of the listenator test;

FIG. 8 of the whistellator test;

FIG. 9 of the bare-line receiving test; and

Figure 10:
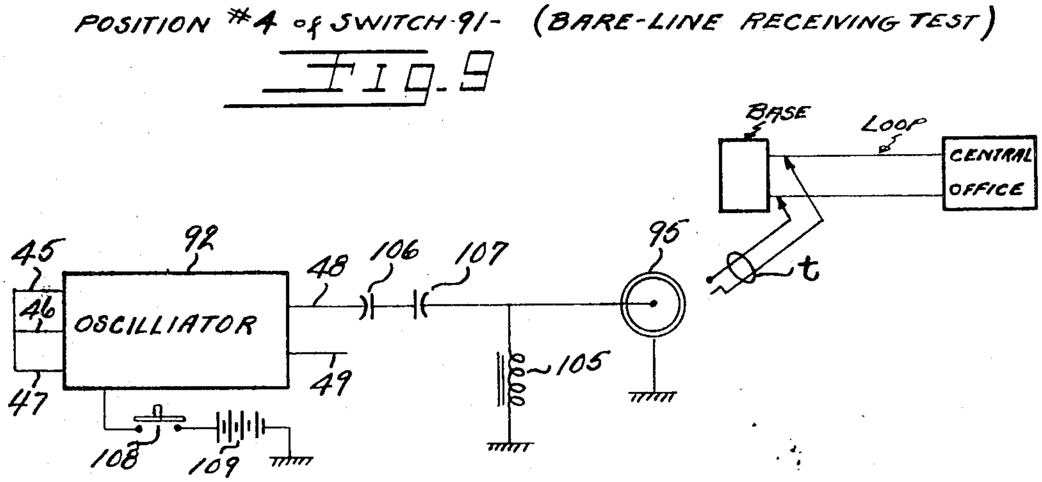

FIG. 10 of the bare-line sending test.

Figure 1:
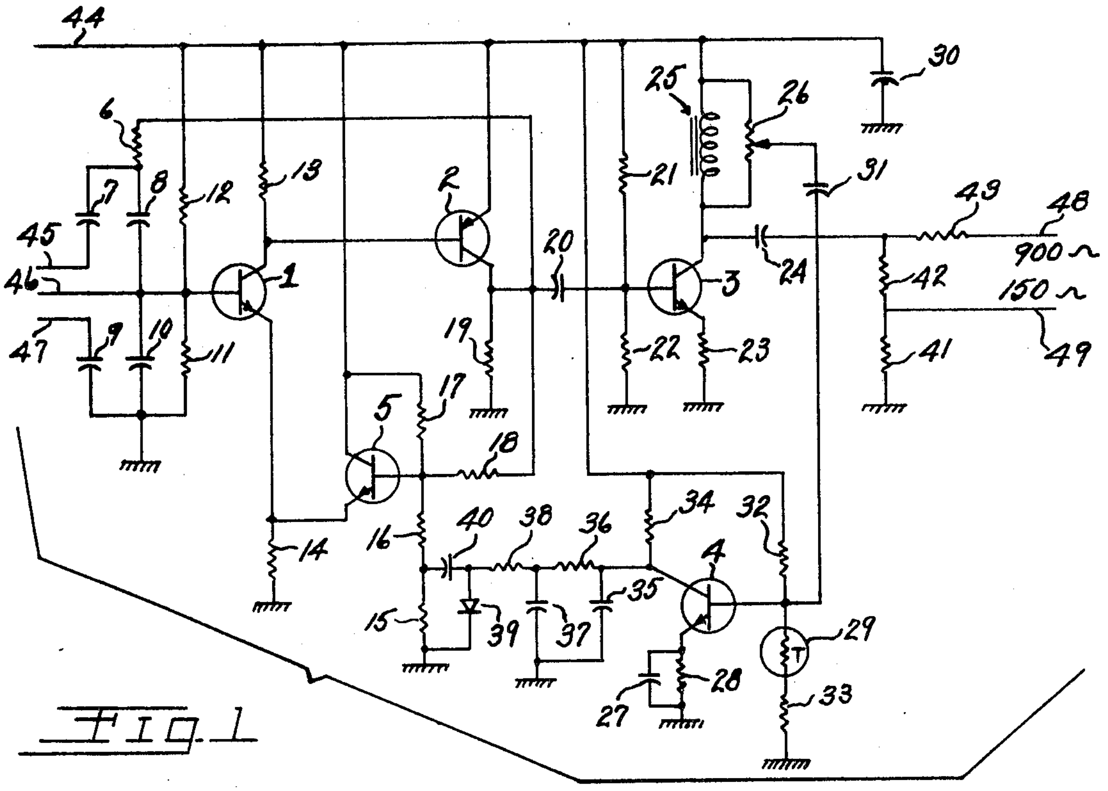
FIG. 1 shows a successful oscillator circuit for this test set.

In the oscillator of FIG. 1, transistors 1 and 2 form a Wien bridge oscillator circuit. The principal elements of the bridge are capacitors 7, 8, 9 and 10 and resistors 6, 11 and 12. Capacitors 7 and 9 are included in the Wien bridge only when wires 45, 46 and 47 are short-circuited (through the rotary switch of FIG. 3). When these wires are short-circuited the output frequency of the oscillator is 1,000 hertz; when they are open-circuited the frequency is 2,300 hertz. The output is amplified by transistor 3 and fed through capacitor 24 to the output network composed of resistors 41, 42 and 43. The output impedance at wire 48 is 900 ohms. At wire 49, the output impedance is 150 ohms. Feedback control is used to maintain a fixed signal level at the collector of transistor 3.

There is a negative feedback path to transistor 1 from the output of transistor 2 through resistor 18 and transistor 5. The gain of this feedback path is controlled from the output of transistor 3. This output is taken from potentiometer 26 and coupled through capacitor 31 to transistor 4 which operates as an amplifier-detector. The output of transistor 4 is filtered by capacitors 35 and 37 and resistors 36 and 38 to provide a DC control voltage which controls the impedance of diode 39. Through blocking capacitor 40, this diode establishes an impedance with parallel resistor 15 and thereby controls the gain of the negative feedback path from the output of transistor 2. The temperature dependence of thermistor 29, working in conjunction with bias resistors 32 and 33, introduces a temperature compensating control current at the base of transistor 4.

The DC operating points of the transistors are established by the biasing elements as follows: transistor 1 by resistors 11, 12, 13 and 14; transistor 2 by resistors 13 and 19; transistor 3 by resistors 21, 22 and 23 and inductor 25, transistor 4 by resistors 28, 32, 33, 34 and thermistor 29; and transistor 5 by resistors 14, 15, 16 and 17.

Wire 44 connects to the DC supply voltage and capacitor 30 provides a shunt path for AC signal currents.

Figure 2:
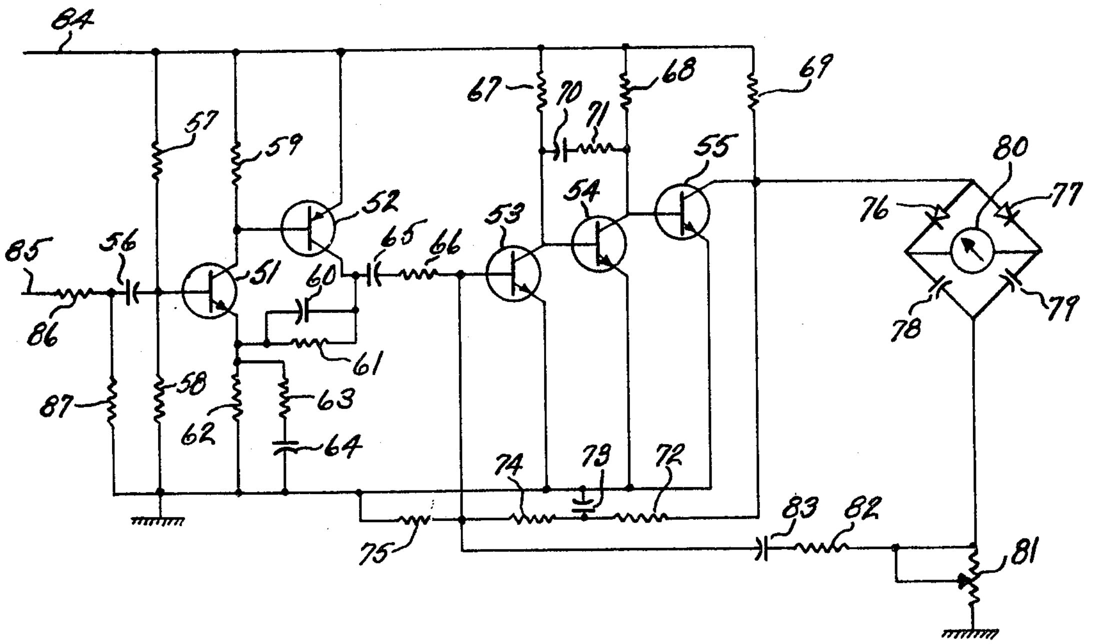
FIG. 2 shows a suitable electronic decibel meter circuit.

In the electronic decibel meter of FIG. 2, the L Pad or voltage divider formed by resistors 86 and 87 attenuates the input signal and presents an input impedance of 150 ohms. Transistors 51 and 52 form a direct coupled preamplifier. Resistors 57, 58, 59, 61 and 62 establish the DC operating points for these two transistors. Coupling capacitors 56 and 65 block DC. Capacitor 64 and resistor 63 provide negative feedback which causes the gain to fall off at low frequencies to reduce the effect of line noise on the meter reading. Capacitor 60 and resistor 61 provide negative feedback which causes the gain to fall off at frequencies above the voice band to prevent high frequency interference from affecting the meter reading. Both of these feedback arrangements improve output stability in the useful frequency range. Resistor 66 couples the preamplifier to succeeding stages without overloading the preamplifier.

The remaining three stages of amplification are composed of transistors 53, 54 and 55 with their respective biasing resistors 67, 68 and 69. These stages are direct-coupled which simplifies biasing arrangements. The output of the amplifier is fed to an averaging detector, consisting of diodes 76 and 77 and capacitors 78 and 79, which converts the signal to DC for operation of meter 80. The return AC path passes through variable resistance 81 which controls the sensitivity of the amplifier. The feedback voltage, by which it does this, is fed through resistor 82 and capacitor 83 to the input of transistor 53 as negative feedback. DC feedback is fed to the same point to provide bias stability. This feedback comes from the collector of transistor 55 through resistors 72 and 74 which with resistor 75 form a voltage divider and which with capacitor 73 form a filter to eliminate AC feedback through this feedback path. There is also a feedback path, formed by capacitor 70 and resistor 71, which is designed to prevent oscillation of the last three stages at the high-frequency end of the transmission band. Meter 80 is a 500 microampere meter of logarithmic design equipped with a 20 db. uniform scale.

Figure 3:
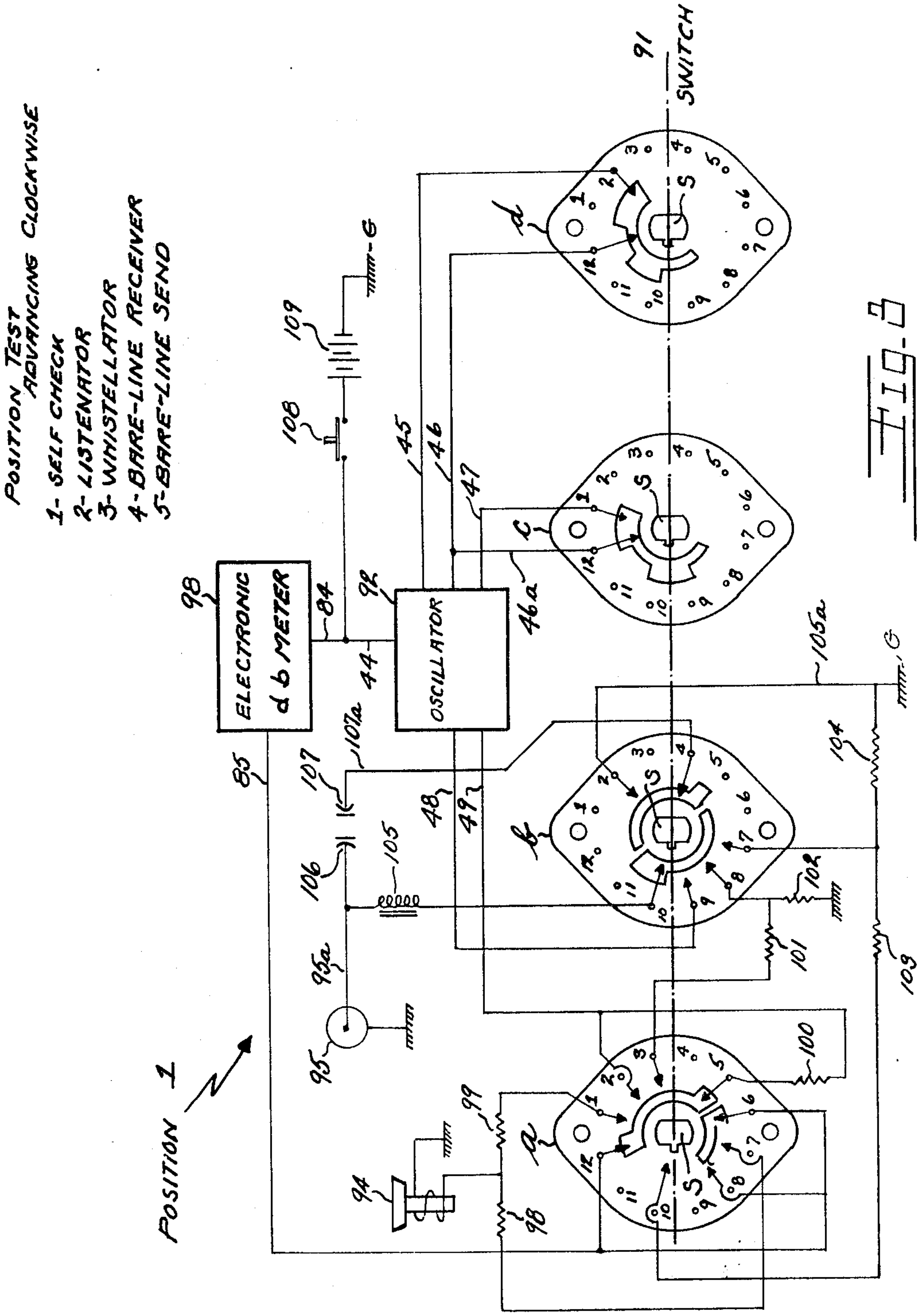
FIG. 3 shows the complete circuit of the test set but with the oscillator and electronic db. meter represented in block diagrammatic form.

FIG. 3 shows how the oscillator 92 and the electronic decibel meter 93, as just described, combine with other circuit elements to form the complete test instrument. The rotary switch 91 which is herein shown as a four deck switch connects the circuit elements together to form the several testing arrangements. Said circuit elements include a transducer 94 which is preferably a Western Electric LA-1 Receiver. A test jack 95 is also provided for connecting of the test set through a test cord *t* to the line terminals of the telephone. Inductor 105 is for holding up a connection at the central office and has an inductance of about 1.5 henrys minimum, with 100 milliamperes maximum direct current flowing through it. Capacitors 106 and 107 block loop current (DC) from the central office to keep it out of the test circuit. pushbutton switch 108 is nonlocking to save the battery 109 preferably of 9 volt size and which is a heavy duty unit intended for long life. Resistors 98 and 99 are selected by calibration tests to match the transducer 94 because of normal variations in the characteristics of the transducer as supplied by the manufacturer. Resistor 100 is shown connected between stationary contacts 2 and 5 on deck *a* in switch 91, and determines the level of the self-check reading. Resistors 101 and 102 form an impedance matching and attenuation network. One end of resistor 102 is connected to the test instrument ground and its opposite end to one end of resistor 101. The opposite end of resistor 101 is likewise connected to stationary contact 3 of switch deck *a* of rotary switch 91. The junction between resistors 101 and 102 is connected to stationary contact 8 of switch deck *b*. Looking into the electronic db. meter from the test jack, the impedance is 900 ohms, resistive.

The electronic db. meter 93 is seen to be connected at its input line 85 to stationary contacts 12, 6 and 8 of switch deck *a*. Power line 84 is connected to one of the stationary contacts of pushbutton switch 108, the other contact of said switch being connected to the positive terminal of the battery 109. The aforementioned power line 44 of oscillator 92 is seen to be preferably connected in parallel with said power conductor 84.

Output conductors 48 and 49 of oscillator 92 are seen to be connected respectively to stationary contact 9 of switch deck *b* of switch 91 and to stationary contact 2 of switch deck *a* and to one end of resistor 100. THe opposite end of said resistor is connected to contact 5 of switch deck *a*. Conductors 45, 46 and 47 of oscillator 92 are similarly connected respectively to stationary contact 2 of switch deck *d*, stationary contact 12 of switch deck *d* and stationary contact 1 of switch deck *c*. Conductor 46 is likewise connected by jumper 46a to stationary contact 12 of deck *c*.

The coil of transducer 94 is seen to have its one end connected to the test instrument ground and its other end connected to the juncture of resistors 98 and 99. The opposite end of resistor 98 is connected to stationary contact 7 of switch deck *a* of switch 91. The opposite end of resistor 99 is similarly connected to stationary contact 1 of said switch deck *a*.

Test jack 95 is seen to have its center conductor 95a connected to one end of inductor 105, the opposite end of said inductor being connected to the stationary contact 10 of switch deck *b* of said switch 91. Said conductor 95a is also connected to one side of coupling capacitor 106, capacitors 106 and 107 being connected in series with each other and, in turn, connected by conductor 107a to stationary contact 4 of switch deck *b*.

The stationary contact 2 of switch deck *b* is likewise connected by conductor 105a to the test instrument ground G. Also grounded is one side of resistor 104. The opposite side of resistor 104 is connected to one end of resistor 103 and to contact 7 of switch deck *b*. The opposite end of said resistor is connected to stationary contact 10 of switch deck *a* of said switch 91.

The decks (*a—d*) of rotary switch 91 are mounted on a common shaft whereby all of the associated rotary contacts thereof are moved simultaneously in a manner as will be understood.

Figure 4:
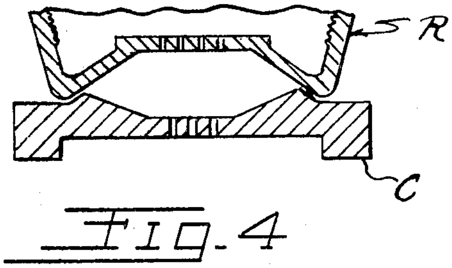
FIG. 4 shows how the telephone receiver fits the transducer cap.

FIG. 4 shows, in cross section view, how a receiver cap of a Western Electric 500 Series set fits the test set transducer cap. The telephone is held by the receiver and placed horizontally, as shown, in making a listenator test. The close, but not tight, fit insures a stable, repeatable test condition without requiring special skill on the part of the tester.

Figure 5:
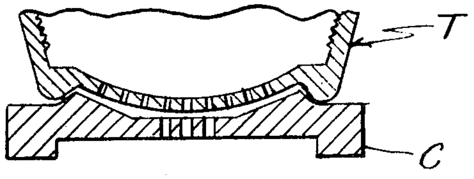
FIG. 5 shows how the telephone transmitter fits the transducer cap.

FIG. 5 shows, in cross section view, how a transmitter cap of a Western Electric 500 Series set fits the same test set transducer cap so that the same transducer can be used for the whistellator test. The telephone is held by the transmitter and placed horizontally on the test set, as shown. The transmitter is then oscillated about its own axis two or three times to settle the carbon granules in a stable position before testing is begun. The close but loose fit avoids vibrations which would jar the carbon granules out of stable position while attempting to settle them. Most telephones now in service will fit the transducer cap. In some cases, mechanical adapters may be furnished to test telephones of different design.

Having described in detail the parts of the test set, each of the testing arrangements will now be briefly described. This discussion will be followed by an explanation of the calibration of the set for each testing arrangement.

Figure 6:
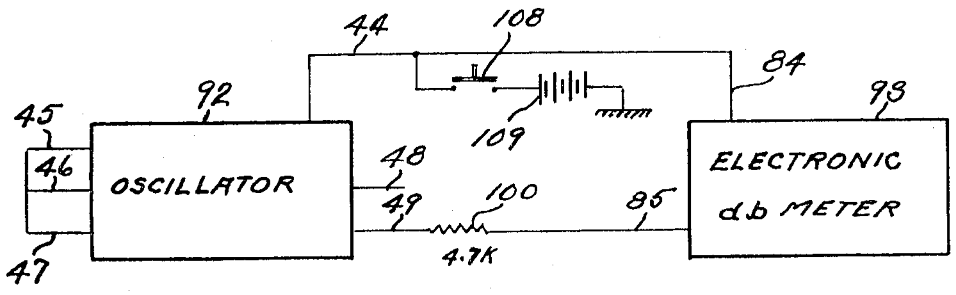
FIG. 6 is a schematic of the self-check test.

With rotary switch 91 in position 1 (As shown in FIG. 3) the test circuit is arranged for the "self check" test as shown in FIG. 6. Here, the oscillator 92 supplies energy at 1,000 hertz from its 150 ohm output through resistor 100 to the input of electronic decibel meter 93. The oscillator will have first been set at correct energy level and the electronic decibel meter at correct sensitivity as discussed later. Resistor 100 is selected to reduce the energy reaching the meter just enough to give a reading in the middle of the check stripe on the meter scale. Thus, whenever the self check test reads in the check stripe, the user is assured that the electronic circuitry of the test set is functioning normally. In this test, as in all of the tests to be described, the test set functions only when pushbutton 108 is operated.

Position 2 of the rotary switch arranges the test circuit for the "listenator" test as shown in FIG. 7. This is the test which determines the receiving efficiency of the loop-and-station equipment. To make this test, the telephone employee, visiting the station, dials into a standard one-milliwatt (1,000 hertz) supply located in the local central office. The sound of tone tells him that the test tone is reaching the receiver; but, at what level he cannot judge by ear. By placing the station receiver firmly on the test set transducer 94, the acoustic energy received is converted to electrical energy of the same frequency and corresponding level. This electrical energy is fed through resistor 99 to the electronic decibel meter. The meter gives a reading which indicates the acoustic level received and therefor the receiving efficiency of loop-and-station. Resistor 99 is selected by a calibration test to be described later. Its purpose is to compensate for normal manufacturing deviations in the characteristics of the transducer 94.

Position 3 of the rotary switch arranges the test circuit for the "whistellator" test as shown in FIG. 8. This test determines the transmitting efficiency of the station equipment, under the battery supply conditions existing at the station. Before making this test at the station, the telephone employee connects the test cord across the line terminals but leaves it unplugged at the test set. He then obtains a normal termination at the central office end, preferably by dialing into a standard quiet termination which has an impedance of 900 ohms, resistive. He listens for the click that tells him the connection is completed and listens also for the absence of objectionable noise on the line. Then he plugs in the test cord and places the station transmitter firmly on the test set transducer. Holding it there he rotates it back and forth smoothly two or three times, to settle the carbon granules. Holding the transmitter in place, he operates pushbutton 108 three or four times and notes that successive readings are within a 2 db. range. The average or middle reading is taken as the level indicating the transmitting efficiency of the station.

How the test set makes this test is shown in FIG. 8. An electrical oscillation of 2,300 hertz is fed from oscillator 92, through resistor 98 into transducer 94 at about 20 dbm. level. There it is converted to a sound oscillation of the same frequency. By selection of the value of resistor 98, the acoustic level of the transducer is calibrated to a reference acoustic level as discussed later. The station transmitter, by modulating the direct current supplied to it by the loop, generates an electric wave of the same frequency. This wave is transmitted through the telephone circuitry to the loop. The AC voltage at the point where this wave enters the loop is transmitted through the test cord, test jack 95, blocking capacitors 106 and 107, and resistor 103 to the electronic decibel meter 93. If the impedance at this point is held constant for various loops, the voltage will indicate the energy level produced by the telephone. Since the loop impedance is quite variable it must be shunted by a low impedance consisting of resistor 104 and the large blocking capacitors 106 and 107 in series. The voltage across resistor 104 is read as an indication of the energy level. Resistor 103 adjusts the sensitivity of the meter to a reference level as discussed later. The blocking capacitors prevent the flow of direct current between the loop and the electronic db. meter and prevent resistor 104 from changing the direct current supplied to the transmitter.

Position 4 of the rotary switch arranges the test circuit for the bare-line receiving test as shown in FIG. 9. With the test cord connected to the loop at the station but left unplugged from the test set, the telephone employee dials into 1 milliwatt, 1,000 hertz supply at the local central office. He then plugs in the test cord and hangs up the telephone. Inductor 105 holds up the connection. Capacitors 106 and 107 keep direct current out of the electronic decibel meter. Resistors 101 and 102 present an input impedance of 900 ohms, resistive, and reduce the sensitivity of the electronic decibel meter to 1 milliwatt at full scale deflection as received at the test jack. The meter then reads the level in dbm. from 0 to 20. Since the level is zero at the central office, it also reads the 900 ohm insertion loss of the loop in db. Energy received via the loop is fed through the test cord, test jack 95, blocking capacitors 106 and 107 and resistor 101 to the electronic decibel meter.

Position 5 of the rotary switch arranges the test circuit for the bare-line sending test as shown in FIG. 10. The oscillator supplies alternating current at 1,000 hertz from its 900 ohm output through blocking capacitors 106 and 107 to test jack 95 and through the test cord to the loop. After the test connection is established at the central office it is held up by inductor 105. The oscillator is calibrated to furnish 1 milliwatt into 900 ohms resistive at the test jack 95.

For the three principal test arrangements, those which provide one-man tests and make use of the meter (these are the listenator, whistellator and receiving tests), there are considerations of reference levels, calibration and meter scale which are important in the design of this test set. The set is intended primarily for use by telephone installers and repairmen. Their main concern is with the presence or absence of a defect. Many of these users will not be familiar with reading meters and stating the value read in db. The test set is designed to simplify their use of it so that they can get the right answer quickly. How this is done will now be discussed.

The meter used has a 500 microampere logarithmic movement, a uniform decibel scale and a range of 20 db. As has been stated, the bare-line receiving test uses a reference level of 1 milliwatt and for this test the scale reads from 0 to 20 dbm. level, or 0 to 20 db. loss between 900 ohm resistive impedances. The meter scale is divided into three segments and colors are applied: i.e., 0 to 7.5 db. is green; 7.5 to 9.5 db. is yellow; 9.5 to 20 is red.

This is done after measurements are made of simulated loops. In actual practice a variety of loop designs were measured. Said loops are assumed to have a 1,200 ohm limit and were terminated at the central office end with a 48 volt, 400 ohm battery supply and with representative central office cabling. The finest gauge loops, for each loop length, were bridged by 6,000 feet of cable at the station end. All of the loops from 0 to 54 kilofeet measured in the 0 to 7.5 db. range, except those between 12 and 18 kilofeet in length. The latter were in the 7.5 to 9.5 db. range. Because so few of the loops should normally exceed 7.5 db., it is considered undesirable to set a flat limit of 9.5 db. So the 0 to 7.5 db. range is designated as the normal loop range and colored green on the meter scale while the 7.5 to 9.5 db. range is called the doubtful range (in which loops deserve further checking) and is colored yellow. Beyond that is the red range which is definitely defective.

Using the same simulated loops, but this time being equipped with a good 500 Series telephone, the receiving efficiency may then be measured (in some cases throughout the useful frequency range). The 1,000 hertz readings are found to be representative and the results are correlated well with the receiving test. It is thus apparent that, if the meter sensitivity could be set at the proper reference point, the dividing line between normal and doubtful performance will fall at 7.5 db. and the same color codes could be used for both receiving and listenator tests. A tentative setting was made and used in a field trial. This trial included both good and defective equipment tested at their station locations. In actual practice many receivers were removed and retested on a simulated loop in the laboratory. The reference level was readjusted as a result of these tests. The corresponding acoustic level was determined for calibration use. Calibration is performed by using a standard telephone receiver with a selected reference voltage and adjusting the meter sensitivity so that the meter reads at its reference point.

Similarly the transmitting efficiency of the type 500 telephone set, on various simulated loops, was also tested. A tentative reference level was then chosen and used in the same field trial. Afterward the reference was readjusted to bring the dividing line, between normal and poor transmitters, to the 7.5 db. point on the meter scale. Reference acoustic power was determined by feeding 2,300 hertz at −20 dbm. to the transducer and measuring the voltage across the standard receiver when it is placed on the transducer. The standard receiver is then used with this voltage to select resistor 98 in each test set. When the sensitivity of the meter was shifted after the field trial, the reference voltage was determined at the test jack and resistor 103 is selected to make that voltage read at the reference point on the meter scale.

The test set of this invention is designed for use by telephone repairmen and installers. It can be used to investigate customer trouble reports such as "can't hear" and "can't be heard." It can be used to check a loop-and-station upon completion of installation work to assure that it will give proper service.

By combining three one-man tests (listenator, whistellator and receiving) in one convenient package, the test instrument makes it possible to determine if a serious transmission defect exists and to assign the defect to one of the three most likely causes—the receiver, the transmitter or the loop. In those rare cases where the defect is not found as indicated, a retest will so indicate and will assist in locating the only remaining cause—the telephone circuitry. The test instrument is therefore a practical tool for locating and clearing all transmission defects in loop-and-station plant.

The test instrument's use can be extended to special investigations of transmission performance. For example it can be used to investigate a private branch exchange and its loops or a private network of PBX—s. It can be used to test trunks of a PBX or a central office. Two of these test sets can be used together to check transmission of a connection or a group of connections. The set can be used to sample the loop-and-station plant of a district or a maintenance center.

The principles used in this invention can be extended by using two transducers instead of one and incorporating a test stand to hold the telephone. Such a testing arrangement can be made suitable for testing telephones on completion of manufacture or overhaul. In another form it can be applied to tests of loop-and-station plant in simulated talking conditions.

Without modification, the whistellator test can also be used to measure loop-and-station transmitting efficiency by simply leaving the test cord unplugged.

Having thus described the test instrument of the present invention, it will be apparent that it may be modified without departing from the scope of the inventive subject matter as defined in the claims.

LIST OF CIRCUIT ELEMENTS

| Component | Value | Component | Value |
|---|---|---|---|
| 1. Transistor | 2N3565 | 25. Inductor | sso23 |
| 2. Transistor | 2N3638 | 26. Potentiometer | 25K |
| 3. Transistor | 2N3565 | 27. Capacitor | 2μf. |
| 4. Transistor | 2N3565 | 28. Resistor | 3.3K |
| 5. Transistor | 2N3565 | 29. Thermistor | 18682–30 |
| 6. Resistor | 22K | 30. Capacitor | 30μf. |
| 7. Capacitor | 3,900pf. | 31. Capacitor | 2μf. |
| 8. Capacitor | 3,000 | 32. Resistor | 430K |
| 9. Capacitor | 3,900 | 33. Resistor | 11K |
| 10. Capacitor | 3,000 | 34. Resistor | 22K |
| 11. Resistor | 33.2K | 35. Capacitor | 0.4μf. |
| 12. Resistor | 100K | 36. Resistor | 27K |
| 13. Resistor | 6.2K | 37. Capacitor | 20μf. |
| 14. Resistor | 2K | 38. Resistor | 100K |
| 15. Resistor | 82K | 39. Diode | 1N914 |
| 16. Resistor | 22K | 40. Capacitor | 2μf. |
| 17. Resistor | 330K | 41. Resistor | 161.8 |
| 18. Resistor | 43K | 42. Resistor | 2.06K |
| 19. Resistor | 4.7K | 43. Resistor | 900K |
| Capacitor | 1μf. | 51. Transistor | 2N3565 |
| 21. Resistor | 68K | 52. Transistor | 2N3638 |
| 22. Resistor | 180K | 53. Transistor | 2N3565 |
| 23. Resistor | 270 | 54. Transistor | 2N3565 |
| 24. Capacitor | 15μf. | 55. Transistor | 2N3565 |
| 56. Capacitor | 2μf. | 80. Meter | 500μa. |
| 57. Resistor | 1 meg | 81. Potentiometer | 100 |
| 58 Resistor | 150 | 82. Resistor | 4.7K |
| 59. Resistor | 15K | 83. Capacitor | 1μf. |
| 60. Capacitor | 6,800pf. | 84. Wire | |
| 61. Resistor | 3.3K | 85. Wire | |
| 62. Resistor | 3.3K | 86. Resistor | 121 |
| 63. Resistor | 150 | 87. Resistor | 30.1 |
| 64. Capacitor | 2μf. | 91. Rotary Switch | |
| 65. Capacitor | 1μf. | 94. Receiver | LA–1 |
| 66. Resistor | 4.7K | 95. Jack | 111 |
| 67. Resistor | 47K | 98. Resistor | cal |
| 68. Resistor | 10K | 99. Resistor | cal |
| 69. Resistor | 1K | 100. Resistor | cal |
| 70. Capacitor | 2,200pf. | 101. Resistor | 20.5K |
| 71. Resistor | 110 | 102. Resistor | 950 |
| 72. Resistor | 390K | 103. Resistor | cal |
| 73. Capacitor | 0.01μf. | 104. Resistor | 82 |
| 74. Resistor | 390K | 105. Inductor | 1682A |
| 75. Resistor | 120K | 106. Capacitor | 10μf. 50v. |
| 76. Diode | 1N914 | 107. Capacitor | 10μf. 50v. |
| 77. Diode | 1N914 | 108. Pushbutton Switch | |
| 78. Capacitor | 2μf. | 109. Battery | |
| 79. Capacitor | 2μf. | | |

I claim:

1. A test instrument for determining the transmitting efficiency of a telephone instrument of a loop-and-station installation while the telephone instrument is normally connected directly through its own loop to its central office without any circuit interposed between said loop and telephone instrument and is receiving therefrom its normal DC biasing energy comprising a transducer means for generating an electrical signal of a single frequency which is at approximately the peak-response frequency of the transmitter of the type of telephone instrument being tested, means for impressing said signal upon said transducer means, the transmitter of the telephone instrument being acoustically coupled to the transducer means to receive therefrom a signal of a standard acoustical level, electrical signal measurement means and conductor means connecting the output terminals of the telephone to said measurement means effective to measure the energy level output of the telephone instrument.